United States Patent

Mount

[11] Patent Number: 4,775,067
[45] Date of Patent: Oct. 4, 1988

[54] PORTABLE FLUID COLLECTION CONTAINER

[76] Inventor: Floyd E. Mount, 105-12th Ave. NW., Waukon, Iowa 52172

[21] Appl. No.: 44,320

[22] Filed: Apr. 30, 1987

[51] Int. Cl.⁴ .................. B65D 25/28; B65D 25/42; F16N 33/00
[52] U.S. Cl. ........................ 220/1 C; 137/312; 141/98; 184/106; 220/94 A; 280/79.1 A
[58] Field of Search ........... 16/18 R, 20, 24, 29, 16/30, 39, 43, 45, 46, 47; 141/1, 98, 339; 137/312; 184/1.5, 106; 220/1 C, 94 A; 206/223; 280/32.6, 79.1 A

[56] References Cited

U.S. PATENT DOCUMENTS

| | | |
|---|---|---|
| Re. 27,449 | 8/1972 | Bartz . |
| D. 183,346 | 8/1958 | Hardy . |
| D. 220,470 | 4/1971 | Lewis . |
| D. 248,845 | 8/1978 | White et al. . |
| 1,468,293 | 9/1923 | Herold .................... 16/29 |
| 1,506,028 | 8/1924 | Perritt .................... 220/1 C |
| 1,554,589 | 9/1925 | Long . |
| 1,568,830 | 1/1926 | Gunderson ............. 184/1.5 |
| 2,332,089 | 10/1943 | Knight .................... 16/20 |
| 3,169,605 | 2/1965 | Ashmead . |
| 3,495,845 | 2/1970 | Jensen . |
| 4,010,863 | 3/1977 | Ebel . |
| 4,054,184 | 10/1977 | Marcinko . |
| 4,099,598 | 7/1978 | Clinard . |
| 4,114,644 | 9/1978 | Piper . |
| 4,114,660 | 9/1978 | Arruda . |
| 4,301,841 | 11/1981 | Sandow . |
| 4,392,552 | 7/1983 | Partridge . |
| 4,408,642 | 10/1983 | Jeruzal et al. . |

FOREIGN PATENT DOCUMENTS

| | | |
|---|---|---|
| D. 2737 | 11/1973 | Fed. Rep. of Germany . |
| 0963389 | 7/1964 | United Kingdom ............. 280/32.6 |
| D. 967340 | 10/1974 | United Kingdom . |
| 1416096 | 12/1975 | United Kingdom . |

OTHER PUBLICATIONS

"Oil Catcher", Machanix Illustrated, Nov. 1976, p. 142.

Primary Examiner—Jimmy G. Foster
Attorney, Agent, or Firm—Burd, Bartz & Gutenkauf

[57] ABSTRACT

A cylindrical-shaped receptacle for receiving and storing fluid drained from a motor vehicle. The receptacle has an annular splash guard that extends inwardly from the top of the side wall of the receptacle. Fluid splashing and slopping up engages the bottom side of the splash guard and remains within the receptacle chamber. An annular channel is provided in the side wall to retard the movement of fluid out of the receptacle. The receptacle has a pair of recesses that are used as handles. A pour hole located between the recesses is used to remove fluid from the receptacle chamber. A plurality of wheels secured to the bottom wall of the receptacle movably support the receptacle.

31 Claims, 4 Drawing Sheets

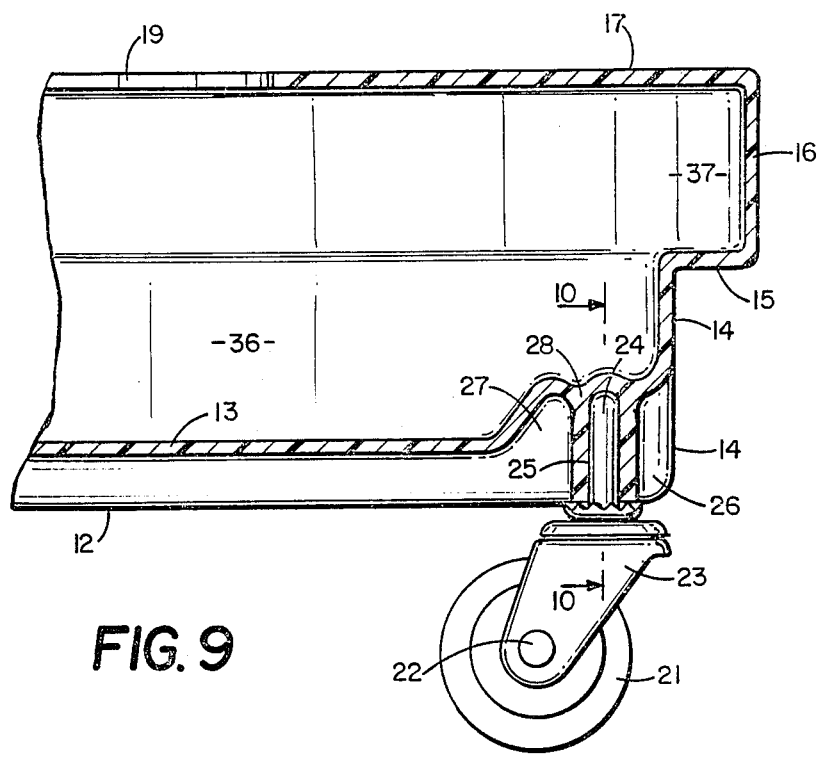
FIG. 9
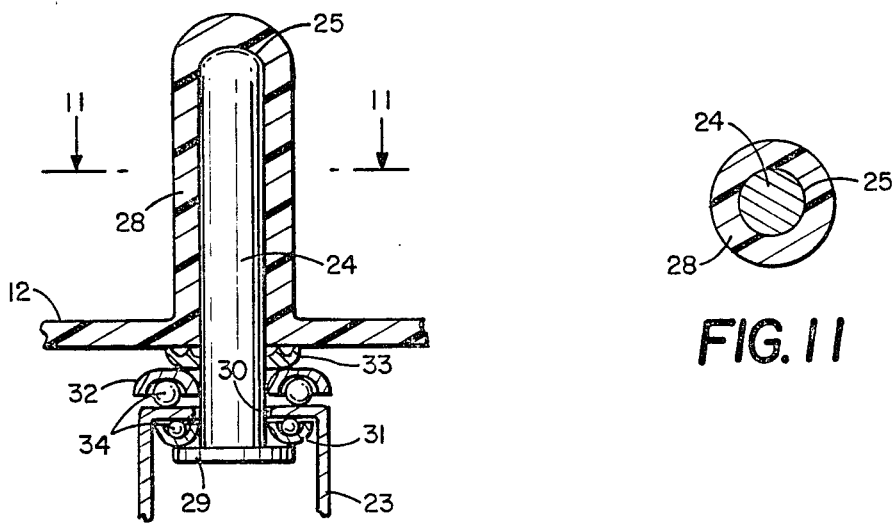
FIG. 10
FIG. 11

PORTABLE FLUID COLLECTION CONTAINER

BACKGROUND OF INVENTION

This invention relates to an apparatus for collecting fluid drained from a motor vehicle, such as a truck, tractor, automobile, and the like. In the past, various structures have been used to receive and store motor vehicle fluid. A device for collecting fluid is disclosed by Partridge in U.S. Pat. No. 4,392,552. The device of Partridge has a shallow rectangular-shaped drain pan which is positioned beneath the engine of a vehicle. A grid is supported by upwardly extending ribs in the interior of the pan. A plurality of rollers attached to the pan allows the pan to be moved under a motor vehicle. Also, empty oil drums with cut-off side walls have been used for collecting waste fluid from trucks.

Prior devices for receiving and storing fluid from a motor vehicle have had many disadvantages. One major difficulty is that the fluid frequently spills and splashes out of the container. When drained from a motor vehicle, fluid may rebound off the bottom wall and over the side walls of the container. Entering fluid pushes the previously collected fluid toward the side walls and top edges of the container. This makes changing fluid a messy and unpleasant chore. Another common problem is moving a container which is full of fluid. A full container is heavy and difficult to move. Fluid often slops over the side walls when the container is moved.

SUMMARY OF THE INVENTION

This invention is directed to a receptacle for fluid drained from a motor vehicle. The receptacle is a drum-shaped container having upright side walls and a top splash guard. The container is supported on a surface, such as a floor or ground, with a plurality of rotatably mounted wheels.

The portable fluid collection container comprises a drum-shaped structure having a cylindrical side wall. The side wall is attached to a circular bottom wall to provide a chamber. The bottom wall has upwardly raised ribs which direct fluid entering the container toward the side wall. An annular flange extends inwardly from the top of the side wall to minimize fluid spillage. The side wall has an annular channel open to the chamber. At the junction of the side wall and the flange is a pour hole. A pair of recesses on opposite sides of the container are used as handles. The pour hole is located equidistant from the recesses to facilitate pouring fluid out of the container. A plurality of wheel are rotatably mounted on the bottom wall of the container. The wheels allow unlimited movement of the container underneath a motor vehicle.

DESCRIPTION OF DRAWING

FIG. 9 is an enlarged sectional view taken along the line 9—9 of FIG. 3;

FIG. 10 is an enlarged sectional view taken along the line 10—10 of FIG. 9; and

FIG. 11 is a sectional view taken along the line 11—11 of FIG. 10.

DESCRIPTION OF THE PREFERRED EMBODIMENT

Figure 1:
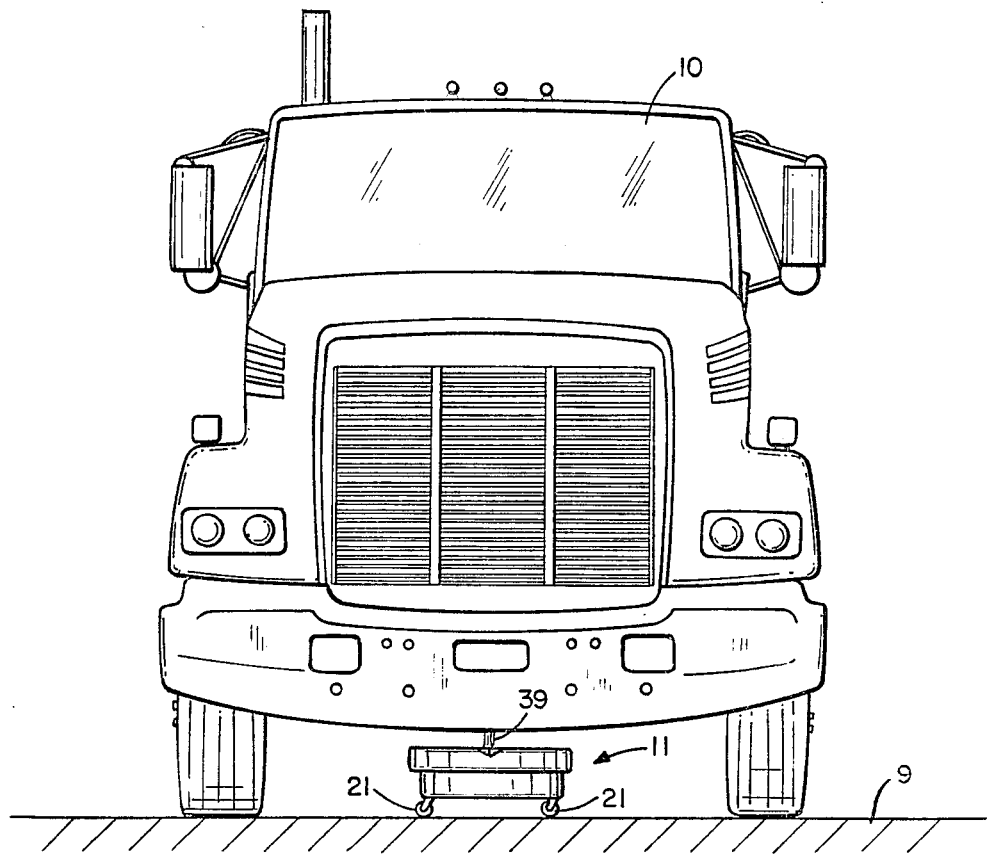
FIG. 1 shows the Portable Fluid Collection Container of the invention located under a truck for receiving and storing liquids being drained from one of the fluid systems of the truck.
Figure 2:
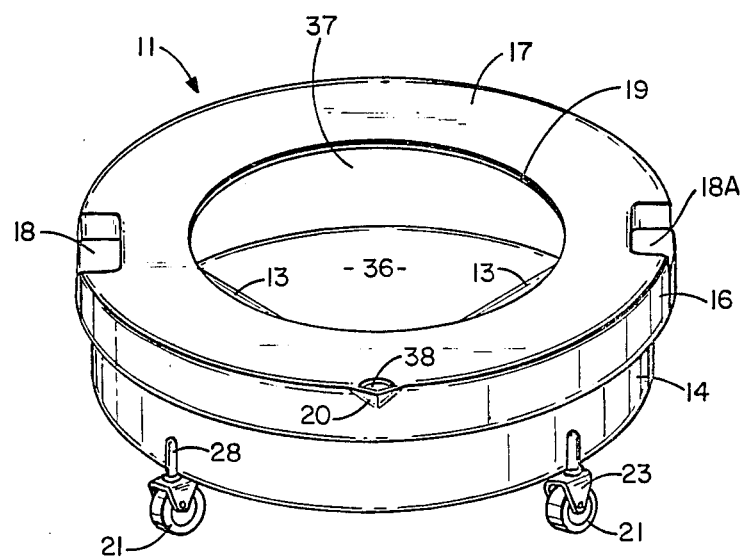
FIG. 2 is a perspective view of the Portable Fluid Collection Container of the invention.
Figure 3:
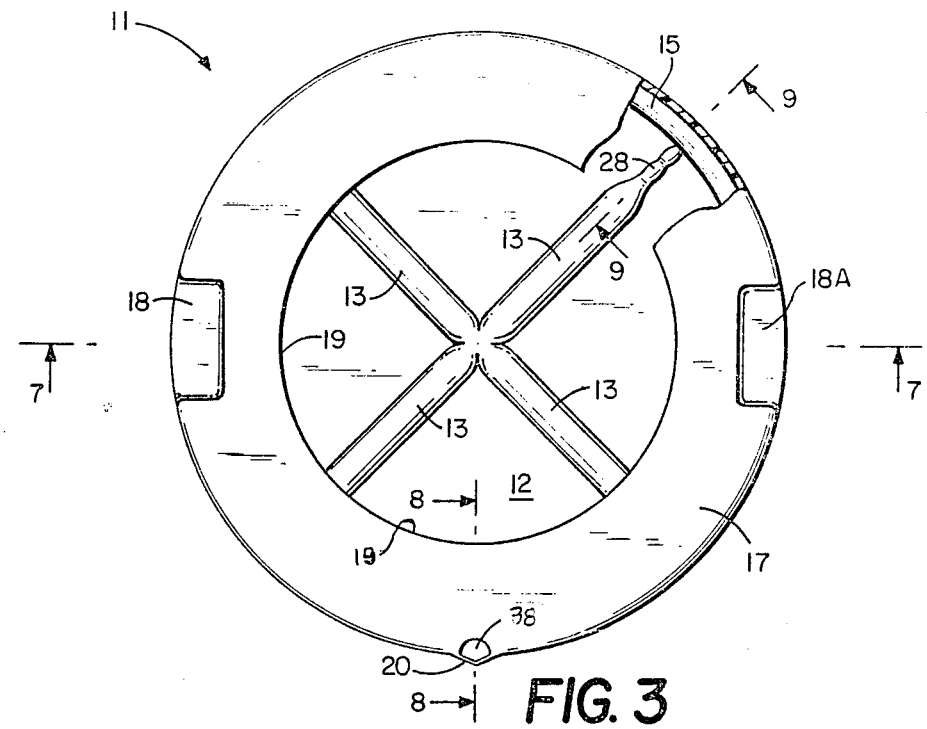
FIG. 3 is a top view thereof with the part of the top splash flange broken away.
Figure 4:
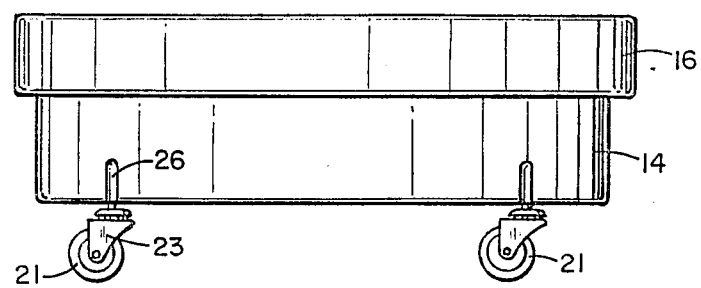
FIG. 4 is a rear view of FIG. 2.
Figure 5:
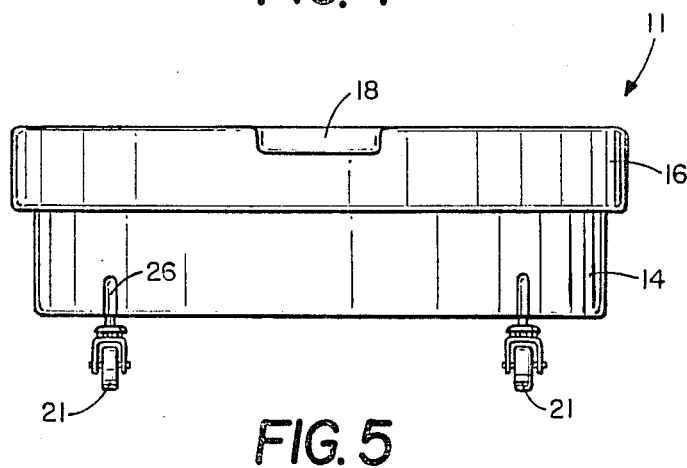
FIG. 5 is a side view of FIG. 2.
Figure 6:
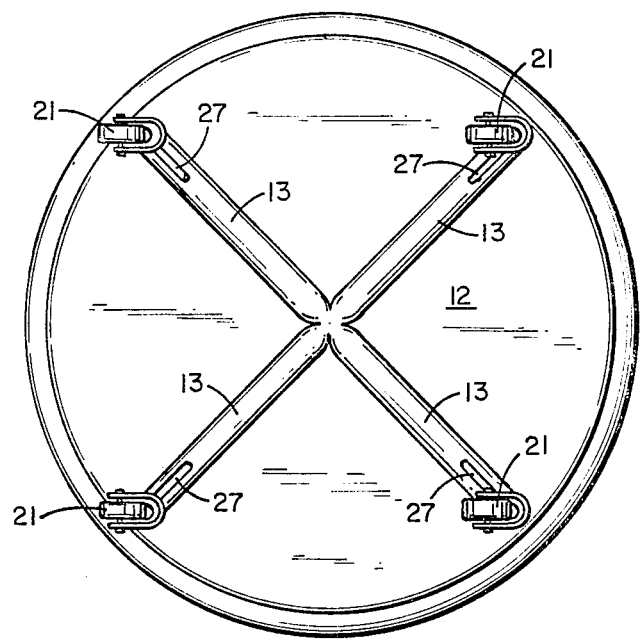
FIG. 6 is a bottom view thereof.

As shown in FIG. 1, waste fluid 39, such as crankcase oil, transmission fluid, brake fluid or radiator fluid, is drained from a truck 10 into a portable fluid collection container or receptacle of the invention indicated generally at 11. Container 11 is positioned underneath truck 10 on the ground 9 to receive fluid 39. Container 11 has a top opening 19 with a circular bottom wall 12. As shown in FIG. 3, bottom wall 12 has upwardly raised radial ribs 13 which intersect in the center of the bottom wall to form a "X". Ribs 13 extend from the center of bottom wall 12 to an upright cylindrical side wall 14 joined to the outer peripheral edge of bottom wall 12. Each rib 13 has an arcuate convex top surface to minimize splashing and rebound of fluid being directed into container 11.

Figure 7:
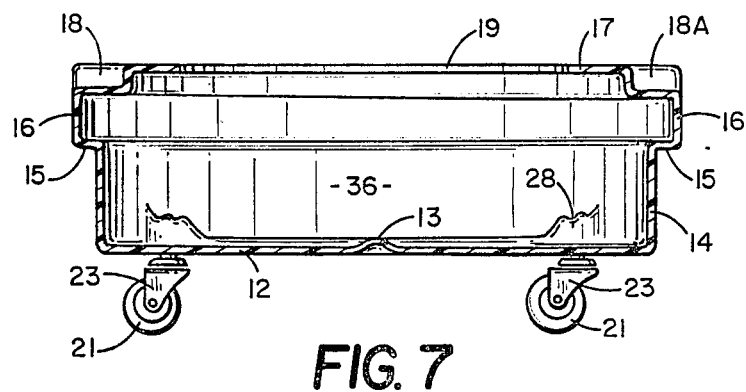
FIG. 7 is an enlarged sectional view taken along the line 7—7 of FIG. 3.
Figure 8:
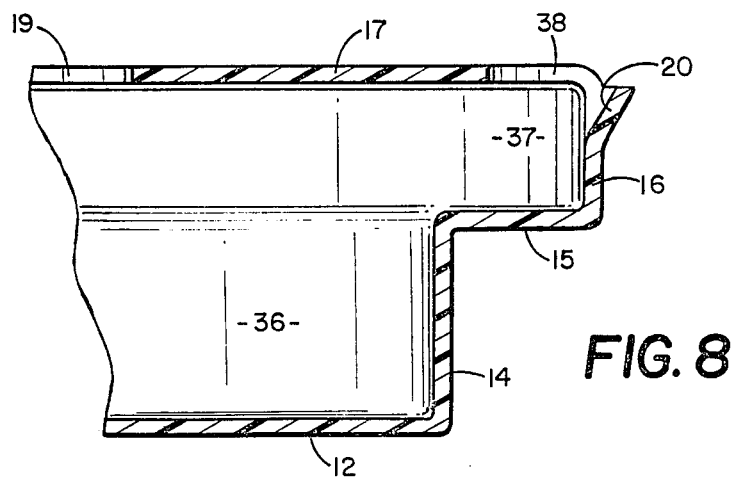
FIG. 8 is an enlarged sectional view taken along the line 8—8 of FIG. 3.

Referring to FIGS. 7 and 8, a cylindrical side wall 14 is attached to the outer edge of bottom wall 12 to define a chamber 36. An annular lip 15 extends outwardly from side wall 14 to a cylindrical upright extension 16 of the side wall. Extension 16 is located between lip 15 and an annular inwardly directed flange 17. Flange 17 is a circular flat ring that functions as a splash shield or guard as it covers the top of the outer circumferential section of chamber 36. Flange 17 projects inwardly at least five inches from the top of extension 16. Flange 17 surrounds a top opening 19 open to the top of chamber 36. Lip 15, extension 16 and flange 17 define an annular channel 37 above side wall 14. Container 11 can be made of tough heavy gauge material that is chemically resistant to motor vehicle fluids, such as polyethlene. Other plastic materials and metal can be used to make container 11. The container 11 has a fifteen gallon capacity. The size of container 11 can vary. The preferred embodiment of container 11 has a diameter of 25 inches and a height of 8 inches. The top opening has a diameter of 16 inches. The overall height of container 11 including wheels 21 is 10 inches. The container 11 is made on one-piece of polyethylene by a rotational molding process.

Container 11 is provided with a pair of handle members or recesses 18 and 18A. The recesses 18 and 18A are located on opposite sides of container 11 at the intersection of extension 16 and flange 17. A person may grip container 11 by placing his or her thumbs in recesses 18 and 18A while positioning fingers under lip 15. A pour hole 38 having a V-shaped spout 20 is provided on the outer edge of flange 17 equidistant from recesses 18 and 18A. Fluid 39 can be poured from container 11 by gripping recesses 18 and 18A and tipping the container toward pour hole 38.

Spillage and splashing of fluid 39 is minimized by ribs 13, channel 37, and flange 17. Ribs 13 limit splashing of the fluid 39 by directing fluid outwardly toward side wall 14 and annular channel 37 as it enters container 11. Fluid 39 strikes ribs 13 at an angle and does not splash directly out of the top of container 11. Fluid 39 splashing or slopping up engages the bottom side of flange 17 and remains inside chamber 36. Flange 17 is wider than the lip 15 in side wall 14 preventing fluid 39 from bouncing off side wall 14 and out of container 11. Thus, the outside of side wall 14 and extension 16, as well as the ground 9, do not become covered with fluid 39.

Container 11 is mounted on a plurality of wheels 21. Referring to FIGS. 9 and 10, wheel 21 is rotatably mounted on an axle 22. The ends of axle 22 extend through a U-shaped bracket 23 whereby the bracket 23 straddles wheel 21. A post 24 extending through a hole 30 in the top of bracket 23 tightly fits into a hole or socket 25 provided in bottom wall 12 to hold wheel 21 to container 11. Post 24 has a force fit in cylindrical slot 25. A groove 26 provided in side wall 14 is adjacent socket 25 in bottom wall 12. A second groove 27 provided in bottom wall 12 is adjacent the slot 25 opposite groove 26 in side wall 14. Grooves 26 and 27 define a slot wall 28. Slot wall 28 is an upward extension of the outer end of each rib 13. A circular base member 29 of post 24 engages an upwardly curved ring 31. The ring 31 surrounds the bottom side of hole 30 in bracket 23. A downwardly curved ring 32 is located between a washer member 33 and the top side of hole 30. Post 24 extends through rings 31 and 32 and a washer 33 before fitting into slot 25. Washer 33 engages container bottom 12 and spaces ring 32 from bottom 12. Rings 31 and 32 carry ball bearings 34 to rotatably mount the bracket 23 and wheel 21 on post 24 for rotation about an upright axis. Each of the wheels 21 mounted on the bottom wall 12 with caster structure shown in FIGS. 9 to 11. As a result, container 11 can be easily and smoothly rolled in any direction on floor 9.

While there has been shown and described a preferred embodiment of the portable fluid collection container of the invention, it is understood that changes in structure, materials, sizes, and shapes can be made by those skilled in the art without departing from the invention. The invention is defined in the followig claims.

The embodiments of the invention in which an exclusive property or privilege is claimed are defined as follows:

1. A receptacle for fluid drained from a motor vehicle comprising: a generally cylindrical container with a circular open top, the container having a side wall and a bottom wall to define a chamber, the side wall having an outwardly extending annular channel, the side wall and flange having a pair of recesses to grip the container, a pour hole located equidistant from the recesses, upwardly raised ribs on the bottom wall that intersect in the middle of the bottom wall, an annular inwardly extending flange which projects over the side wall and a portion of the bottom wall to retain splashing and spilling fluid within the chamber, and a plurality of wheel means mounted on the bottom wall to movably support the container.

2. The receptacle of claim 1 wherein: each rib has an outer end section, an upwardly directed socket open to the bottom of said bottom wall in each outer end section of each rib, said wheel means having a post extended into each socket, a bracket rotatably mounted on the post, and a wheel rotatably mounted on the bracket.

3. A fluid collection receptacle for fluid drained from a motor vehicle comprising: a generally cylindrical container having a bottom wall, an upright side wall secured to the bottom wall forming a chamber for holding fluid, said side wall having an outwardly extended annular lip and an upright extension wall joined to the lip, and an annular inwardly extending flange attached to an upper portion of the extension wall to provide an annular outwardly directed channel between said lip and flange open to the chamber whereby said flange maintains splashing and slopping fluid within the channel and chamber, said flange surrounding a top opening open to the chamber, and means having an opening to facilitate the pouring of fluid from the container.

4. The receptacle of claim 3 said bottom wall having a plurality of upwardly directed sockets open to the bottom thereof, a plurality of wheels attached to the bottom wall to movably support the container on a surface, each of said wheels having a post extended with a tight fit into each socket, a bracket rotatably mounted on each post, and a wheel rotatably mounted on the bracket.

5. The receptacle of claim 3 including: means joined to the extension wall for gripping with the hands of a person the container to facilitate handling of the container.

6. The receptacle of claim 5 wherein: said means for gripping the container include first gripping means joined to the entension wall, and second gripping means joined to the extension wall, said second gripping means being located on the opposite side of said extension wall from the first gripping mens.

7. The receptacle of claim 6 including: handle means located on opposite sides of the spout joined to the extension wall to facilitate handling of the container.

8. The receptacle of claim 3 wherein: the means having an opening includes a fluid pouring spout joined to said extension wall, said spout pouring having a passage to allow fluid to be poured from said container.

9. A fluid collection receptacle for fluid drained from the motor vehicle comprising: a generally cylindrical container, the container having an upright side wall secured to a bottom wall to provide an inner chamber, and an annular inwardly extending flange attached to an upper portion of the side wall to retain splashing and slopping fluid within the chamber, said flange surrounding a top opening open to the chamber, said side wall and flange have a pair of recesses used to grip the container.

10. The receptacle of claim 9 including: a pour hole in the side wall located equidistant from the recesses.

11. The receptacle of claim 9 wherein: the bottom wall has upwardly raised ribs, the ribs intersecting in the middle of the bottom wall.

12. A fluid collection receptacle for fluid drained from a motor vehicle comprising: a generally cylindrical container, the container having an upright side wall secured to a bottom wall to provide an inner chamber, and an annular inwardly extending flange attached to an upper portion of the side wall to retain splashing and slopping fluid within the chamber, said flange surrounding a top opening open to the chamber, said bottom wall has a plurality of radial ribs, each rib having an outer end section, an upwardly directed socket open to the bottom of said bottom wall in each outer end section of each rib, and wheel means attached to each outer end section, said wheel means having a post extended into each socket, a bracket rotatably mounted on the post, a wheel rotatably mounted on the bracket;

13. The receptacle of claim 12 wherein: the side wall has an annular upper section projected in a radial outward direction providing an annular outwardly directed channel adjacent the flange.

14. The receptacle of claim 4 wherein: the side wall has a spout adjacent discharge opening in the upper section thereof.

15. The receptacle of claim 14 wherein: the side wall and flange have recesses used to grip the receptacle to facilitate the pouring of liquid out of the discharge opening thereof.

16. A receptacle for fluid drained from a motor vehicle comprising: a container with an open top, bottom wall, and a side wall secured to the bottom wall to provide a chamber for holding fluid, the side wall having an outwardly extending lip and an upright extension wall, an annular inwardly extending flange secured to an upper portion of the extension wall said lip, extension wall, and flange providing an annular channel open to the chamber to retain splashing and spilling fluid within the channel and chamber, said flange surrounding an opening open to the chamber, fluid pouring spout joined to the extension wall, said spout having a passage to allow fluid to be poured from said container, and handle means joined to said extension wall to facilitate handling of the container to assist in pouring fluid through the passage to a selected location.

17. The receptacle of claim 16 including: a plurality of wheel means attached to the bottom wall, said wheel means having brackets rotatably mounted on the bottom wall of the container.

18. A receptacle for fluid drained from motor vehicle comprising: a generally cylindrical container with an open top, bottom wall, and a side wall secured to the bottom wall to provide a chamber, a side wall having a outwardly extending annular channel, upwardly raised ribs on the bottom wall, and an annular inwardly extending flange secured to the side wall adjacent the annular channel to retain splashing and spilling fluid within the chamber, said flange surrounding an opening open to the chamber, a pair of recesses in the side wall and flange used to grip the container.

19. The receptacle of claim 18 wherein: said side wall has a pour hole located equidistant from the recesses.

20. A receptacle for fluid drained from a motor vehicle comprising: a generally cylindrical container with a circular open top, the container having a bottom wall and side wall secured to a circular bottom wall to define a chamber for holding fluid, said side wall having an outwardly extending annular channel, and a fluid discharge opening, upwardly raised ribs on said bottom wall that intersect in the middle of the bottom wall, each rib has an outer end section, an upwardly directed socket open to the bottom of said bottom wall in each outer end section of each rib, an annular inwardly extending flange secured to the side wall adjacent the annular channel to retain splashing and spilling fluid within the channel and chamber, said flange surrounding an opening open to said chamber, and a plurality of wheel means mounted on the bottom wall to movably support the container, each said wheel means having a post extended into a socket, a bracket rotatably mounted on the post, and a wheel rotatably mounted on the bracket.

21. The receptacle of claim 20 including: a pair of recesses in the side wall and flange used to grip the container.

22. The receptacle of claim 20 including: means for gripping with the hands of a person the container to facilitate handling thereof, said means for gripping the container including first gripping means joined to the side wall, and second gripping means joined to the side wall, said second gripping means being located on the opposite side of said side wall from the first gripping means.

23. A receptacle for collecting fluid drained from a motor vehicle comprising: a container with an open top, a side wall, and a bottom wall to define a chamber for accommodating fluid, said side wall having an outwardly stepped portion forming a channel, an inwardly extended flange secured to said side wall above said channel to retain splashing and spilling fluid in the chamber, said flange surrounding a top opening open to the chamber, said bottom wall having a plurality of generally radial ribs, a spout joined to the side wall having a discharge opening to the chamber to allow liquid to flow from said chamber and handle means joined to the side wall to allow a person to grip the container to facilitate the pouring of liquid through the discharge opening to a selected location.

24. The receptacle of claim 23 wherein: said handle means includes a pair of recesses in the side wall and flange to facilitate the gripping of the container.

25. The receptacle of claim 23 wherein: said handle means comprise first and second handle means located on opposite sides of the spout.

26. The receptacle of claim 23 wherein: said side wall has an annular outwardly extended lateral lip located below said flange and said side wall including an upright extension wall joined to the lip and annular flange to form an annular channel.

27. A fluid collection receptacle for fluid drained from motor vehicle comprising: a container having an upright side wall, a bottom wall secured to the side wall to provide a chamber for accommodating fluid, an annular inwardly directed flange attached to an upper portion of the side wall to retain splashing and slopping fluid within said chamber, said flange surrounding a top opening open to the chamber, and a spout having a discharge opening joined to the side wall to facilitate draining of fluid from said chamber, said bottom wall having a plurality of upwardly directed sockets open to the bottom thereof, a plurality of wheels attached to the bottom wall to movably support the container on a surface, each of said wheels having a post extended with a tight fit into each socket, a bracket rotatably mounted on each post, and a wheel rotatably mounted on the bracket.

28. The receptacle of claim 27 including: handle means joined to the side wall to allow a person to grip the container to facilitate the pouring of fluid through the discharge opening to a selected location.

29. The receptacle of claim 28 wherein: the handle means includes recesses in the side wall and flange to facilitate the gripping of the container.

30. The receptacle of claim 28 wherein: the handle means comprise first and second handle means located on opposite sides of the spout.

31. The receptacle of claim 28 wherein: the side wall has an outwardly directed lip located below the flange and an upright extension wall joined to the lip and flange to form a channel open to the chamber.

* * * * *